United States Patent Office 3,161,567
Patented Dec. 15, 1964

3,161,567
PROCESS FOR RELIEVING PAIN WITH 3-p-CHLOROPHENOXY - 2 - HYDROXY-PROPYL CARBAMATE
Robert James Collins, Kalamazoo Township, Kalamazoo County, Mich., and Richard J. Matthews, Abbington Township, Lackawanna County, Pa., assignors to The Upjohn Company, Kalamazoo, Mich., a corporation of Delaware
No Drawing. Filed May 29, 1963, Ser. No. 283,993
4 Claims. (Cl. 167—65)

The present invention relates to a process for medical treatment and more particularly to a process for the freeing of a subject in a state of pain of traumatic origin from awareness of the pain.

This application is a continuation-in-part of application Serial No. 118,766, filed June 22, 1961, now abandoned.

A wide variety of methods have been used for the symptomatic relief of pain, i.e., methods such as hypnosis, hypothermy, and the administration of various kinds of drugs. The process of relieving pain by administering drugs is by far the most practiced, probably because the process can be accomplished without requiring a great amount of skill on the part of the operator. In many cases the subject can self-administer the drug, particularly this is true when the drug is an analgesic, i.e., a drug which relieves pain by altering the subject's awareness of the pain without causing loss of consciousness or inducing sleep.

The present invention is a process for relieving a subject's awareness of pain of traumatic origin comprising the administration to the subject in a state of pain of traumatic origin a composition comprising 3-p-chloro phenoxy-2-hydroxy-propyl carbamate in association with a pharmaceutical carrier.

As used in the present specification and claims pain of traumatic origin is taken to mean the pain that arises from injury to the tissues and is taken to include headaches.

The compositions of the present invention are presented for oral administration to humans and mammals in solid and liquid unit dosage forms, such as tablets, capsules, powders, granules, syrups, elixirs and the like, containing suitable quantities of 3-p-chlorophenoxy-2-hydroxy-propyl carbamate as the essential active ingredient.

Powders are quite simply prepared by comminuting 3-p-chlorophenoxy-2-hydroxy-propyl carbamate to a suitably fine size and mixing with a similarly comminuted diluent. The diluent can be an edible carbohydrate material such as starch. Advantageously, a sweetening agent or sugar is present as well as a flavoring oil. Dry granulations for reconstitution with water are prepared utilizing water-soluble diluents. A powder mixture of finely divided 3-p-chlorophenoxy-2-hydroxy-propyl carbamate and a water-soluble diluent such as sucrose, glucose, and the like, is wetted with a binder such as acacia mucilage or gelatin solution and forced through a screen to form granules which are allowed to dry. Advantageously, a thickening or suspending agent such as methylcellulose is present as well as a wetting agent and flavoring oil.

Capsules are produced by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, granulating or slugging, adding a lubricant and pressing into tablets. The powder mixture is prepared by mixing 3-p-chlorophenoxy-2-hydroxy-propyl carbamate suitably comminuted, with a diluent or base such as starch, lactose, kaolin, dicalcium phosphate, terra alba, and the like. The powder mixture can be granulated by wetting with a binder such as starch paste, corn syrup, gelatin solution, methylcellulose solution or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet-forming dies by the addition of stearic acid, a stearate salt, talc or mineral oil. The lubricated mixture is then compressed into tablets. Advantageously the tablet can be provided with a protective coating consisting of a sealing coat of shellac, a coating of sugar and methylcellulose and a polish coating of carnauba wax.

Oral fluids are prepared in unit dosage forms such as syrups and elixirs wherein each teaspoonful of composition contains a predetermined amount of 3-p-chlorophenoxy-2-hydroxy-propyl carbamate for administration. A syrup is prepared by dispersing the 3-p-chlorophenoxy-2-hydroxy-propyl carbamate in a suitably flavored aqueous sucrose solution. Similarly an elixir is prepared utilizing a hydro-alcoholic vehicle.

For parenteral administration aqueous fluid unit dosage forms can be prepared. In preparing the parenteral form, a measured amount of powdered 3-p-chlorophenoxy-2-hydroxy-propyl carbamate is placed in a vial, the vial and its contents sterilized and sealed. An accompanying vial of sterile water is provided as a vehicle to form a suspension prior to administration. Advantageously the sterile water can have dissolved therein a local anesthetic and buffering agents.

Alternatively, a parenteral suspension can be prepared by suspending the powdered 3-p-chlorophenoxy-2-hydroxy-propyl carbamate in a parenterally acceptable vegetable oil with or without additional adjuvants, and sterilizing after filling into vials.

In addition to oral and parenteral administration, the rectal route can be utilized. The 3-p-chlorophenoxy-2-hydroxy-propyl carbamate can be administered by means of a suppository. A vehicle which has a melting point at about body temperature or one that is readily dispersible can be utilized. For example, cocoa butter and various solid polyethylene glycols can serve as the vehicle.

For the treatment of domestic birds and animals by oral administration, the 3 - p - chlorophenoxy-2-hydroxy-propyl carbamate is conveniently prepared in the form of a food premix. The food premix can comprise the 3-p-chlorophenoxy-2-hydroxy-propyl carbamate in admixture with an edible pharmaceutical diluent of the type previously mentioned such as starch, oatmeal, flour, calcium carbonate, talc, dried fish meal and the like non-toxic, orally acceptable pharmaceutical diluents. The prepared premix is then conveniently added to the regular feed, thereby providing medication to the animal or bird in the course of feeding.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specification for the novel unit dosage forms of this invention is dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, capsules, pills, powder packets, granules, wafers, cachets, segregated multiples of any of the foregoing and other forms as herein described.

In addition to the administration of 3-p-chlorophenoxy-2-hydroxy-propyl carbamate as the principal active ingredient of compositions for the treatment of the conditions described herein, the said compound can be included with other types of compounds to obtain advantageous combinations of properties. Such combinations can include 3 - p - chlorophenoxy-2-hydroxy-propyl carbamate in combination with other analgetic agents such as codeine, aspirin, acetophenetidin, salicylamide and N-acetyl-p-aminophenol; hypnotic agents such as the barbiturates and chloral hydrate; steroids such as hydrocortisone, prednisolone, methylprednisolone and 6α-fluoro-prednisolone; muscle relaxants such as chlorzoxazone, carisoprodol, mephenesin, meprobamate, phenaglycodol and zoxazolamine; and antihistamines such as chlorpheniramine maleate, thenylpyramine fumarate, prophenpyridamine, and pyrilamine.

The amount 3-p-chlorophenoxy-2-hydroxy-propyl carbamate that is to be administered depends on the age, weight of the patient, the particular condition to be treated and the route of administration. A dose of from about 5 to about 30 mg. per kg. of body weight or a total dose to humans of from about 0.5 to 2 grams given as a single dose, which can be repeated in 3–4 hours, embraces the preferred dosage range for the relief of pain for which the said compound is effective.

Veterinary dosages will correspond to human dosages with amounts administered being in proportion to the weight of the animal as compared to adult humans.

The 3-p-chlorophenoxy-2-hydroxy-propyl carbamate is compounded with a suitable pharmaceutical diluent in unit dosage form for convenient and effective administration; in a preferred embodiment of this invention, a unit dosage form containing 3 - p - chlorophenoxy-2-hydroxy-propyl carbamate in an amount of from about 500 mg. to about 2 grams is administered. The dosage of compositions containing 3-p-chlorophenoxy-2-hydroxy-propyl carbamate and one or more other active ingredients is to be determined with reference to the usual dosage of each such ingredient.

PREPARATION I

3-p-Chlorophenoxy-2-Hydroxy-Propyl Carbamate 1.0 mole of 3-p-chlorophenoxy-1,2-propanediol (chlorphenexin) is suspended in 1000 ml. of benzene in a five liter flask equipped with a dropping funnel, thermometer and stirrer. 1.0 mole of phosgene in 500 ml. of cold, dry benzene is then added dropwise over a period of 45 minutes, the resulting mixture being maintained at 30° C. until all solid material is dissolved. 1.0 mole of triethylamine is added dropwise and the resulting reaction mixture stirred for 45 minutes at 30° C. following the addition. The reaction mixture is then cooled to 5° C. and extracted repeatedly with 600 ml. portions of cold water to remove the triethylamine hydrochloride. The benzene fraction, containing the intermediate 3 - p-chlorophenoxy-3-hydroxy-propyl chlorocarbonate, is added to 600 ml. of cold concentrated ammonium hydroxide and the resulting reaction mixture agitated vigorously at 5° C. for seven hours. The crude 3-p-chlorophenoxy - 2 - hydroxy-propyl carbamate solid is then filtered off, dissolved in hot benzene, dried to remove all traces of water, and permitted to crystallize out. Several recrystallizations from solvent mixtures of benzene and toluene, with small amounts of acetone, produced a crystalline white solid in about 65 percent yield. The product is 3 - p - chloro-phenoxy-2-hydroxy-propyl carbamate, melting at 89–91° C. The infrared spectrum of this compound in chloroform solution shows a strong band at 1730 cm.$^{-1}$.

EXAMPLE 1

One thousand scored tablets are prepared from the following types and amounts of ingredients:

| | Gm. |
|---|---|
| 3-p-chlorophenoxy-2-hydroxy-propyl-carbamate | 500 |
| Aspirin | 325 |
| Magnesium stearate | 25 |

The ingredients are mixed together and slugged. The slugs are screened and pressed into tablets, each tablet weighing 850 milligrams.

The tablets so prepared are useful in the treatment of pain associated with headaches at a dose of one tablet.

Following surgical procedures a dose of four tablets can be given to adults for the control of pain.

EXAMPLE 2

One thousand hard gelatin capsules are prepared from the following types and amounts of ingredients:

| | Gm. |
|---|---|
| 3-p-chlorophenoxy-2-hydroxy-propyl carbamate | 500 |
| Codeine phosphate | 16.2 |
| Starch | 50 |

The ingredients are powdered and mixed together until uniformly dispersed and filled into hard gelatin capsules.

The capsules so prepared are useful in the alleviation of the traumatic pain following tooth extraction at a dose of 1 capsule. The dose can be repeated every 4–6 hours as required.

Following amputation of a limb, a dose of four tablets can be given to an adult for the control of pain.

Following the foregoing procedure codeine phosphate can be substituted in 32.4 and 64.8 gram amounts.

EXAMPLE 3

One thousand cc. of a syrup suspension is prepared from the following types and amounts of materials:

| 3 - p - chlorophenoxy - 2 - hydroxy - propyl carbamate | gm. | 50 |
|---|---|---|
| Cacao syrup, U.S.P., q.s. | cc. | 1000 |

The 3-p-chlorophenoxy-2-hydroxy-propyl carbamate is stirred, with the cacao syrup until uniformly distributed.

The composition so prepared is useful in the treatment of pain in adults at a dose of 2 teaspoonfuls (10 cc.).

EXAMPLE 4

A sterile parenteral suspension for intramuscular use, containing 500 mg. of 3-p-chlorophenoxy-2-hydroxy-propyl carbamate in 2 cc., is prepared from the following types and amounts of ingredients:

| 3 - p - chlorophenoxy - 2 - hydroxy - propyl carbamate | gm. | 250 |
|---|---|---|
| Benzyl benzoate | cc. | 50 |
| Cottonseed oil, q.s. | cc. | 1000 |

The 3-p-chlorophenoxy-2-hydroxy-propyl carbamate and benzyl benzoate are dispersed in sufficient cottonseed oil added to make 1000 cc. The suspension is sterilized and filled into 2 cc. ampoules.

The compositions so prepared are useful in the treatment of pain in adults at a dose of 2 cc. intramuscularly every 4–6 hours as needed.

EXAMPLE 5

A sterile aqueous suspension for intramuscular use, containing in 2 cc. 500 mg. of 3-p-chlorophenoxy-2-hydroxy-propyl carbamate is prepared from the following types and amounts of materials:

| | Gm. |
|---|---|
| 3 - p - chlorophenoxy - 2 - hydroxy - propyl carbamate | 250 |
| Sodium carboxymethylcellulose, low viscosity | 7.5 |
| Polyvinylpyrrolidone | 7.5 |
| Polysorbate 80 | 4 |
| Methylparaben | 2.5 |
| Propylparaben | 0.17 |
| Water for injection, q.s. 1000 cc. | |

The sodium carboxymethylcellulose, polyvinylpyrrolidone and polysorbate 80 are dispersed in sufficient water and sterilized by autoclaving at 120° C. for 30 minutes. The finely powdered 3-p-chlorophenoxy-hydroxy-propyl carbamate, methylparaben and propylparaben are sterilized separately by treatment with ethylene oxide, then mixed well in a suitable blender and finally dispersed in the cooled, autoclaved vehicle. The finished sterile suspension is packaged aseptically in sterile vials.

The composition so prepared is useful in the treatment of pain in adults at a dose of 2 cc.

EXAMPLE 6

1000 gm. of a feed mix is prepared from the following types and amounts of ingredients:

| Ingredient | Gm. |
|---|---|
| 3 - p-chlorophenoxy - 2 - hydroxy - propyl carbamate | 20 |
| Soybean meal | 400 |
| Fish meal | 400 |
| Wheat germ oil | 50 |
| Sorghum molasses | 130 |

The ingredients are mixed together and pressed into pellets.

The composition can be fed to small animals, i.e., dogs, cats, and monkeys for treatment of pain.

What is claimed is:

1. A process for inducing a state of analgesia comprising the administration of 3-p-chlorophenoxy-2-hydroxy-propyl carbamate to a subject in a state of pain of traumatic origin.

2. A process for inducing a state of analgesia in a human comprising the administration of 3-p-chlorophenoxy-2-hydroxy-propyl carbamate and aspirin to a human subject in a state of pain of traumatic origin.

3. A process for inducing a state of analgesia in a human comprising the administration of from about 500 mg. to about 4 gm. of 3-p-chlorophenoxy-2-hydroxy-propyl carbamate in association with a pharamaceutical carrier to a human subject in a state of pain of traumatic origin.

4. A process for inducing a state of analgesia in a human comprising the administration of 3-p-chlorophenoxy-2-hydroxy-propyl carbamate to a human subject in a state of pain of traumatic origin at a dosage level of from about 5 mg. to about 30 mg. per kg. of body weight.

References Cited in the file of this patent

UNITED STATES PATENTS

| 2,813,104 | McDowell | Nov. 12, 1957 |
| 2,878,158 | Stuehmer | Mar. 17, 1959 |

OTHER REFERENCES

Robinson: J. Am. Pharm. Assoc., Sc. Ed., vol. XLVI, No. 9, page 556, September 1957.

Wilson: American Drug Index, 1960, J. B. Lippincott Co., page 82.